United States Patent [19]
Kelly et al.

[11] Patent Number: 5,907,553
[45] Date of Patent: *May 25, 1999

[54] POWER SAVINGS IN MULTIPLE TECHNOLOGY PHYSICAL LAYER DEVICES SUPPORTING AUTONEGOTIATION

[75] Inventors: N. Patrick Kelly, Sacramento; David W. Vogel, El Dorado Hills, both of Calif.

[73] Assignee: Level One Communications, Inc., Sacramento, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/826,829

[22] Filed: Apr. 8, 1997

[51] Int. Cl.$^6$ .................................. H04J 3/17; H04J 3/16
[52] U.S. Cl. ................................. 370/433; 370/465
[58] Field of Search ..................... 370/433, 213, 370/248, 282, 286, 358, 359, 366, 393, 414, 419, 445, 465; 375/239; 455/38.3

[56] References Cited

U.S. PATENT DOCUMENTS

| | | | |
|---|---|---|---|
| 5,355,375 | 10/1994 | Christensen | 370/85.8 |
| 5,432,775 | 7/1995 | Crayford | 370/213 |
| 5,546,549 | 8/1996 | Barrett et al. | 395/309 |
| 5,610,903 | 3/1997 | Crayford . | |

FOREIGN PATENT DOCUMENTS 0 766 434   4/1997   European Pat. Off. .

*Primary Examiner*—Huy D. Vu
*Assistant Examiner*—Chiho Andrew Lee
*Attorney, Agent, or Firm*—Merchant, Gould, Smith, Edell, Welter, & Schmidt, P.A.

[57] ABSTRACT

A Physical Layer Device is disclosed having power savings features operable during auto-negotiation for multiple technologies. Excessive power consumption is alleviated by decreasing the power required by the receiver(s) during parallel detection. The Physical Layer Device includes at least one port, with each port including a parallel detection receiver for receiving data and messages from a connected device, the data and messages including autonegotiation fast link pulses indicating a technology capability of the connected device, a cycler for enabling the parallel detection receiver for a fraction of an autonegotiation period and a controller for controlling the cycler. The enabling of the receiver for each port, whether a multiple or single port device, is staggered to prevent more than one receiver from being enabled at one time. Accordingly, the receivers are enabled for a brief period of time to check for the presence of the required signals, and then disabled for a much greater period of time before being enabled again. Further, the Physical Layer Devices contains multiple ports that can stagger the enabling of their receivers so that only one port's receiver is active at any given time.

13 Claims, 9 Drawing Sheets

| Bit | Technology | Minimum cabling requirement |
|---|---|---|
| A0 | 10BASE-T | Two-pair Category 3 |
| A1 | 10BASE-T full duplex | Two-pair Category 3 |
| A2 | 100BASE-TX | Two-pair Category 5 |
| A3 | 100BASE-TX full duplex | Two-pair Category 5 |
| A4 | 100BASE-T4 | Four-pair Category 3 |
| A5 | Reserved for future technology | |
| A6 | Reserved for future technology | |
| A7 | Reserved for future technology | |

FIG. 4

| Bit | Technology |
|---|---|
| A0 | 100BASE-T2 |
| A1 | 100BASE-T2 Full Duplex (1=Full Duplex, 0=Half Duplex) |
| A2 | 100BASE-T2 Device ID (1=Repeater, 0=DTE) |
| A3 | 100BASE-T2 Master/Slave Override Enable (1=Override enable, 0=No override) Used to force a particular Master/Slave mode. To be used in conjunction with bit A4 |
| A4 | 100BASE-T2 Master/Slave Override Value (1=Master, 0=Slave), ignored if A3=0 |
| A5 | 100BASE-T2 Master/Slave Seed Bit 0 (lsb) |
| A6 | 100BASE-T2 Master/Slave Seed Bit 1 |
| A7 | 100BASE-T2 Master/Slave Seed Bit 2 (msb) |

FIG. 5

| RANKING | TECHNOLOGY TYPE |
|---|---|
| 1 | 100BASE-T2 FULL DUPLEX |
| 2 | 100BASE-T2 |
| 3 | 100BASE-TX FULL DUPLEX |
| 4 | 100BASE-T4 |
| 5 | 100BASE-TX |
| 6 | 10BASE-T FULL DUPLEX |
| 7 | 10BASE-T |

FIG. 6

POWER SAVINGS IN MULTIPLE TECHNOLOGY PHYSICAL LAYER DEVICES SUPPORTING AUTONEGOTIATION

BACKGROUND OF THE INVENTION

1. Field of the Invention

This invention relates in general to a Physical Layer Device, and more particularly to a Physical Layer Device having power savings features operable during autonegotiation for multiple technologies.

2. Description of Related Art

Recent advancements in the art of data communications have provided great strides in resource sharing amongst computer systems through the use of networks which offer reliable high-speed data channels. Networks allow versatility by defining a common standard for communication so that information according to a standard protocol may be exchanged across user applications. As the popularity of networks increase so does the demand for performance. More sophisticated protocols are being established to meet this demand and are utilizing existing twisted pair wires, as well as more advanced transmission media, in office buildings so that many users have access to shared resources at minimal expense.

As will be appreciated by those skilled in the art, communication networks and their operations can be described according to the Open Systems Interconnection (OSI) model which includes seven layers including an application, presentation, session, transport, network, link, and physical layer. The OSI model was developed by the International Organization for Standardization (ISO) and is described in "The Basics Book of OSI and Network Management" by Motorola Codex from Addison-Wesley Publishing Company, Inc., 1993 (First Printing September 1992), and which is incorporated by reference herein.

Each layer of the OSI model performs a specific data communications task, a service to and for the layer that precedes it (e.g., the network layer provides a service for the transport layer). The process can be likened to placing a letter in a series of envelopes before it is sent through the postal system. Each succeeding envelope adds another layer of processing or overhead information necessary to process the transaction. Together, all the envelopes help make sure the letter gets to the right address and that the message received is identical to the message sent. Once the entire package is received at its destination, the envelopes are opened one by one until the letter itself emerges exactly as written.

In a data communication transaction, however, each end user is unaware of the envelopes, which perform their functions transparently. For example, an automatic bank teller transaction can be tracked through the multi-layer OSI system. One multiple layer system (Open System A) provides an application layer that is an interface to a person attempting a transaction, while the other multiple layer system (Open System B) provides an application layer that interfaces with applications software in a bank's host computer. The corresponding layers in Open Systems A and B are called peer layers and communicate through peer protocols. These peer protocols provide communication support for a user's application, performing transaction related tasks such as debiting an account, dispensing currency, or crediting an account.

Actual data flow between the two open systems (Open System A and Open System B), however, is from top to bottom in one open system (Open System A, the source), across the communications line, and then from bottom to top in the other open system (Open System B, the destination). Each time that user application data passes downward from one layer to the next layer in the same system more processing information is added. When that information is removed and processed by the peer layer in the other system, it causes various tasks (error correction, flow control, etc.) to be performed.

The ISO has specifically defined all seven layers, which are summarized below in the order in which the data actually flows as they leave the source:

Layer 7, the application layer, provides for a user application (such as getting money from an automatic bank teller machine) to interface with the OSI application layer. That OSI application layer has a corresponding peer layer in the other open system, the bank's host computer.

Layer 6, the presentation layer, makes sure the user information (a request for $50 in cash to be debited from your checking account) is in a format (i.e., syntax or sequence of ones and zeros) the destination open system can understand.

Layer 5, the session layer, provides synchronization control of data between the open systems (i.e., makes sure the bit configurations that pass through layer 5 at the source are the same as those that pass through layer 5 at the destination).

Layer 4, the transport layer, ensures that an end-to-end connection has been established between the two open systems and is often reliable (i.e., layer 4 at the destination confirms the request for a connection, so to speak, that it has received from layer 4 at the source).

Layer 3, the network layer, provides routing and relaying of data through the network (among other things, at layer 3 on the outbound side an address gets placed on the envelope which is then read by layer 3 at the destination).

Layer 2, the data link layer, includes flow control of data as messages pass down through this layer in one open system and up through the peer layer in the other open system.

Layer 1, the physical interface layer, includes the ways in which data communications equipment is connected mechanically and electrically, and the means by which the data moves across those physical connections from layer 1 at the source to layer 1 at the destination.

The primary standard for Local and Metropolitan Area Network technologies is governed by IEEE Std. 802, which is incorporated by reference herein. IEEE Std. 802 describes the relationship among the family of 802 standards and their relationship to the ISO OSI Basic Reference Model. Generally, IEEE Std. 802 prescribes the functional, electrical and mechanical protocols, and the physical and data link layers for Local and Metropolitan Area Networks (LAN/MAN). The specification augments network principles, conforming to the ISO seven-layer model for OSI, commonly referred to as "Ethernet". In the hierarchy of the seven-layer model, the lowest layers, the so-called physical and data link layers, comprise functional modules that specify the physical transmission media and the way network nodes interface to it, the mechanics of transmitting information over the media in an error-free manner, and the format the information must take in order to be transmitted.

While there are several LAN technologies in use today, Ethernet is by far the most popular. The Ethernet standards include protocols for a 10 Mbps baseband transmissions typically referred to as 10Base-X. Computers equipped with a 10Base-X Ethernet interface attachments may link to other computers over an Ethernet LAN. These Ethernet LAN's provide fast and reliable data transmission networks. Nevertheless, the need for faster data transmission has led to the development of faster standards. One such standard includes the Fast Ethernet standards typically referred to as 100Base-X. The 100Base-X standards generally follow the 10Base-X standards except that the baseband data transmission rate increases from 10 Mbps to 100 Mbps. The 100Base-X standard, however, retains the original CSMA/CD medium access control mechanism.

The 100Base-X standards include the 100Base-T standard for interconnecting devices over an ordinary twisted pair telephone cable. The 100Base-T standard is popular for providing an inexpensive LAN in many modern offices.

In March 1995 an IEEE 802.3 task force was formed for developing transceiver specification on an IEEE 802.3 100Base-T2 media type. On Mar. 5, 1996 a preliminary IEEE draft was published identifying changes to IEEE standard 802.3 100Base-T designated IEEE standard P802.3y, herein incorporated by reference. The standard specifies the family of physical layer implementations including one for 100Base-T2 which uses two pairs of ISO/IEC 11801 category 3, 4, or 5 balance cable.

10Base-T and 100Base-Tx are already widely established within the networking industry, while 100Base-T2 is an emerging standard. Other technology standards are also available or emerging such as 100 Base T4 or 1 Gigabit standards. Physical Layer devices may contain multiple technology transceivers to support 10 Base T, 100 Base X, 100 Base T4, or 1 Gigabit technologies, including auto-negotiation functions.

The IEEE Standard 802.3 100Base-T Fast Ethernet and draft changes to IEEE 802.3 100Base-T include mechanisms for auto-negotiation of the media speed. As the 100 Mbps standard becomes more widely adopted, computers are being equipped with Ethernet interfaces that operate at both 10 Mbps and 100 Mbps. The auto-negotiation function is an optional part of the Ethernet standard that allows the devices to exchange information about their abilities. This, in turn, allows the devices to perform automatic configuration to select a common communication mode over the link. Generally, auto-negotiation provides automatic speed matching for multi-speed devices on a LAN. Multi-speed Ethernet interfaces can then take advantage of the highest speed offered on the LAN.

After establishing an Ethernet connection, network devices typically transmit encoded baseband serial data. The devices package the data into frames sometimes referred to as a packet. Each Ethernet packet typically includes a preamble (62 bits long), a start of frame delimiter (2 bits long), a destination address (6 bytes long), a source address (6 bytes long), a type field address (2 bytes long), a data field (46 to 1.5K bytes long), and a frame check sequence (4 bytes long). These packets are physically sent over a network which interconnects devices.

The basic mechanism to achieve auto-negotiation is to pass information encapsulated within a burst of closely spaced linked tertiary test pulses that individually meet the 10Base-T transmitter waveform for linked test pulse. This burst of pulses is referred to as a fast link pulse (FLP) burst. The FLP burst consists of a series of link and tertiary test pulses that form an alternating clock/data sequence. Extraction of the data bits from the FLP burst yields a Link Code Word that identifies the operational mode supported by the remote device, as well as some information used for the auto-negotiation function's handshake mechanism. Multiple technologies may be advertised via the Link Code Word, and each device must support the data service ability for a technology it advertises.

The auto-negotiation arbitration function is responsible for determining the common mode of operation shared by link partners and for resolving multiple common modes. Since two devices may have multiple abilities in common, IEEE 802.3u and P802.3y specify a prioritization scheme to insure that the highest common denominator ability is chosen.

To enable the autonegotiation functions, a Physical layer device will contain an autonegotiation state machine. The autonegotiation state machine will first check to see if autonegotiation is enabled after reset. If autonegotiation is not enabled, the state machine remains in this state. If autonegotiation is enabled, the state machine disables transmission, waits for a period of time guaranteed to break the link with the connected partner, and then begins the autonegotiation process as described above. As mentioned, once the link is broken, the local device transmits Fast Link Pulses which announce its available technologies to the connected device. The local device also waits for either fast link pulses or signals characteristic of a specific technology to be transmitted by the connected device.

This second method is known as parallel detection. However, parallel detection causes a problem in Physical Layer Devices implementing multiple technologies and/or multiple ports. Receivers for each technology must be enabled on each port causing power consumption that requires more expensive IC packages and heat dissipation techniques.

Thus, it can be seen that there is a need to decrease the power required by the receivers during parallel detection.

It can also be seen that there is a need for the receivers to be enabled for a brief period of time to check for the presence of the required signals, and then be disabled for a much greater period of time before being enabled again.

It can also be seen that there is a need for Physical Layer Devices containing multiple ports that can stagger the enabling of the receivers so that only one port's receiver is active at any given time.

SUMMARY OF THE INVENTION

To overcome the limitations in the prior art described above, and to overcome other limitations that will become apparent upon reading and understanding the present specification, the present invention discloses a Physical Layer Device having power savings features operable during auto-negotiation for multiple technologies.

The present invention solves the above-described problems by decreasing the power required by the receivers during parallel detection.

A system in accordance with the principles of the present invention includes a plurality of ports, with each port including a parallel detection receiver for receiving data and messages from a connected device, the data and messages including autonegotiation fast link pulses indicating a technology capability of the connected device, a cycler for enabling the parallel detection receiver for a fraction of an autonegotiation period and a controller for controlling the cycler. The enabling of the receiver for each port is staggered to prevent more than one receiver from being enabled at one time.

Other embodiments of a system in accordance with the principles of the invention may include alternative or optional additional aspects. One such aspect of the present invention is that the Physical Layer Device includes a parallel detection receiver for detecting a technology ability of a connected device, a shift register for receiving a port identification code, the shifting of the identification code allowing an indication of port enablement, a duty cycle counter for controlling the shifting of the port identification codes in the shift register and for providing a disable signal for disabling the parallel detection receiver, and an autonegotiation arbitration state machine for receiving the indication of port enablement from the shift register and for receiving the disable signal from the duty cycle counter, the arbitration state machine enabling the parallel detection receiver upon receiving the port enablement indication and disabling the parallel detection receiver upon receipt of the disable signal from the duty cycle counter.

Another aspect of the present invention is that the receivers are enabled for a brief period of time to check for the presence of the required signals, and then disabled for a much greater period of time before being enabled again.

Another aspect of the present invention is that the Physical Layer Devices contains multiple ports that can stagger the enabling of their receivers so that only one port's receiver is active at any given time.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 4 is a table illustrating the technology bit filed for identifying the technical capabilities by the Link Code Word for the IEEE 802.3 selector Base Page;

FIG. 5 is a table illustrating the technology bit field for identifying the technical capabilities of a device by the Link Code Word for a first page;

FIG. 6 is a table representing the priority schedule for the technologies identified through the Link Code Word auto-negotiation process;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a Physical Layer Device having power savings features operable during auto-negotiation for multiple technologies. A Physical Layer Device according to the present invention allows the power required by the receivers during parallel detection to be decreased. The receivers are enabled for a brief period of time to check for the presence of the required signals, and then disabled for a much greater period of time before being enabled again. For Physical Layer Devices containing multiple ports, the enabling of the receivers is staggered so that only one port's receiver is active at any given time.

Figure 1:
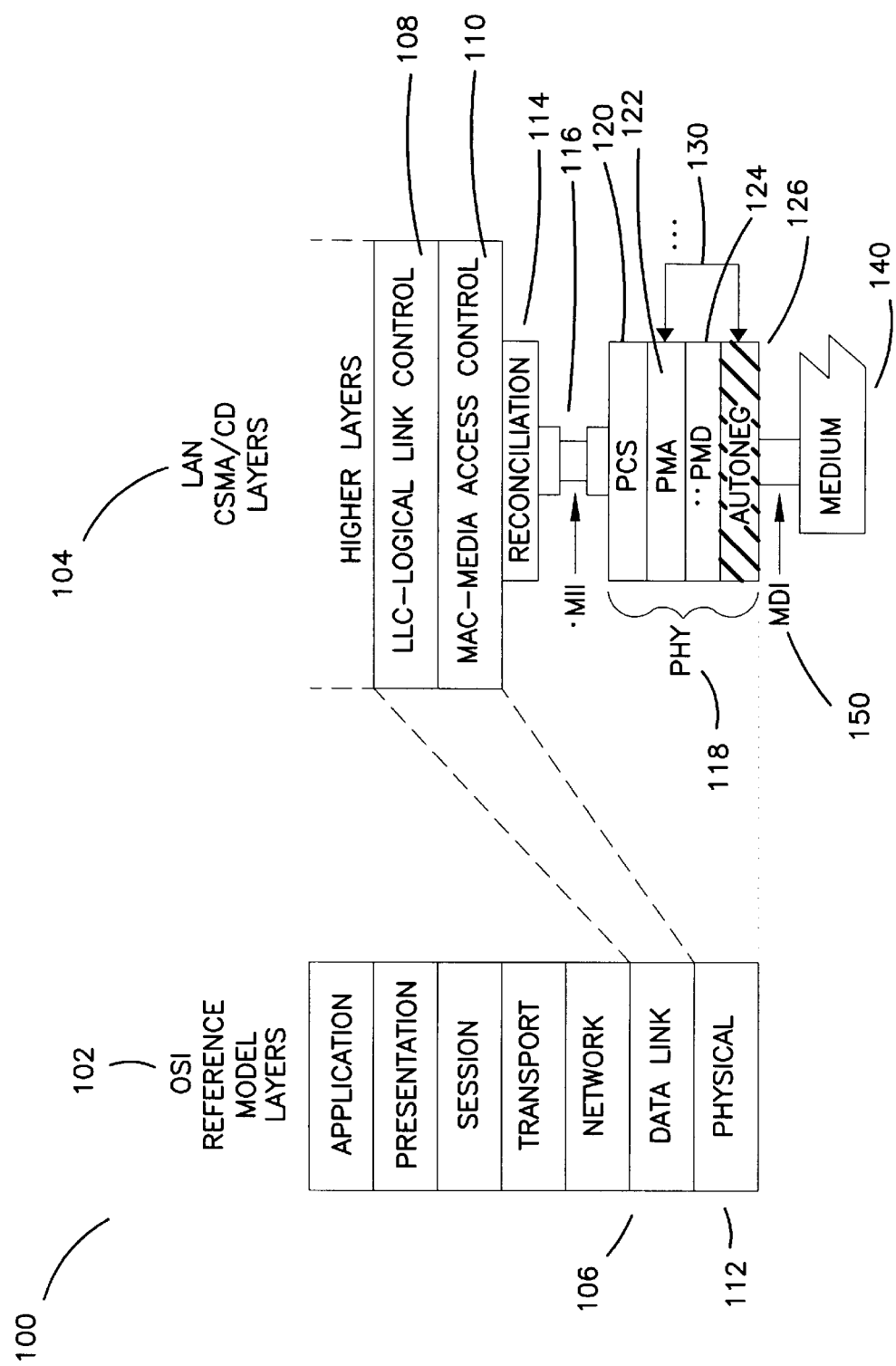
FIG. 1 illustrates the auto-negotiation function with reference to the comparison of the OSI reference model to the LAN CSMA/CD layers.

The auto-negotiation function specified in IEEE 802.3u, herein incorporated by reference, is illustrated with reference to the comparison 100 of the OSI reference model 102 to the LAN CSMA/CD layers 104 as shown in FIG. 1. The data link 106 in the OSI model corresponds to the logical link control (LLC) 108 and the media access control (MAC) 110 in the LAN CSMA/CD layers 104. The physical layer 112 in the OSI model 100 corresponds to the reconciliation layer 114, the medium independent interface 116, and the Physical Layer Device 118.

The Physical Layer Device 118 includes the physical coding 120, the physical medium attachment 122, the physical medium dependent 124, and the auto-negotiation sublayers 126. However, the physical medium dependent sublayer 124 is not specified for 100Base-FX.

The IEEE specification for the physical layer concerns issues such as the physical characteristics of the transmission medium (typically an electrical wire or cable, although fiber optics or wireless transmission is used in some implementations) and the mechanical connection from the station to the transmission medium. This specification addresses physical specifications, including plug dimensions, the number of pins in the plug, and the placement of the pins. Also addressed are electrical issues, such as the voltage levels of the signals that flow on the wire, and functional issues, such as the meaning of a particular voltage level on a given wire.

The physical coding sublayer (PCS) 120 provides services to the MAC sublayer 110. The PCS sublayer 120 in a source station is responsible for encoding the data passed down from the MAC sublayer 110 in a transmitting station. The data encoding function is responsible for translating the bits being transmitted into the proper electrical signals that are then broadcast over the transmission medium.

The PCS sublayer 120 in a destination station is responsible for decoding the signal it receives. The decoding function translates received signals into an appropriate bit stream and passes the resulting data up to the MAC sublayer 110. The PCS sublayer 120 is also responsible for listening to the transmission medium, notifying the MAC sublayer 110 whether the carrier is free or busy, and detecting collisions.

The physical medium attachment (PMA) sublayer 122 provides services to the PCS sublayer 120. It performs a translation function between the PCS sublayer 120 and the transmission medium 140 and defines the characteristics of a particular type of transmission medium 140. The interface between the MAC sublayer 110 and the PCS sublayer 120 (the PCS-PMA interface) defines the services that a PMA sublayer entity 122 supplies to a PCS sublayer entity 120.

The PCS 120 and PMA 122 sublayers may be implemented in the same device or in separate devices. The interface between the PMA sublayer 122 and the transmission medium 140 (the PMA-Medium interface) is a concrete interface called the Medium Dependent Interface (MDI) 150. The MDI 150 for a particular form of transmission medium defines the characteristics of cable segments (sometimes called the trunk cable), connectors for joining cable segments and connecting cable segments to equipment, and terminators used at the ends of cable segments. Although the transmission medium ordinarily consists of a physical cable, such as coaxial cable, twisted-pair cable, or fiber-optics cable, it can also consist of a microwave link, or other wireless link, in some Ethernet implementations.

Figure 2:
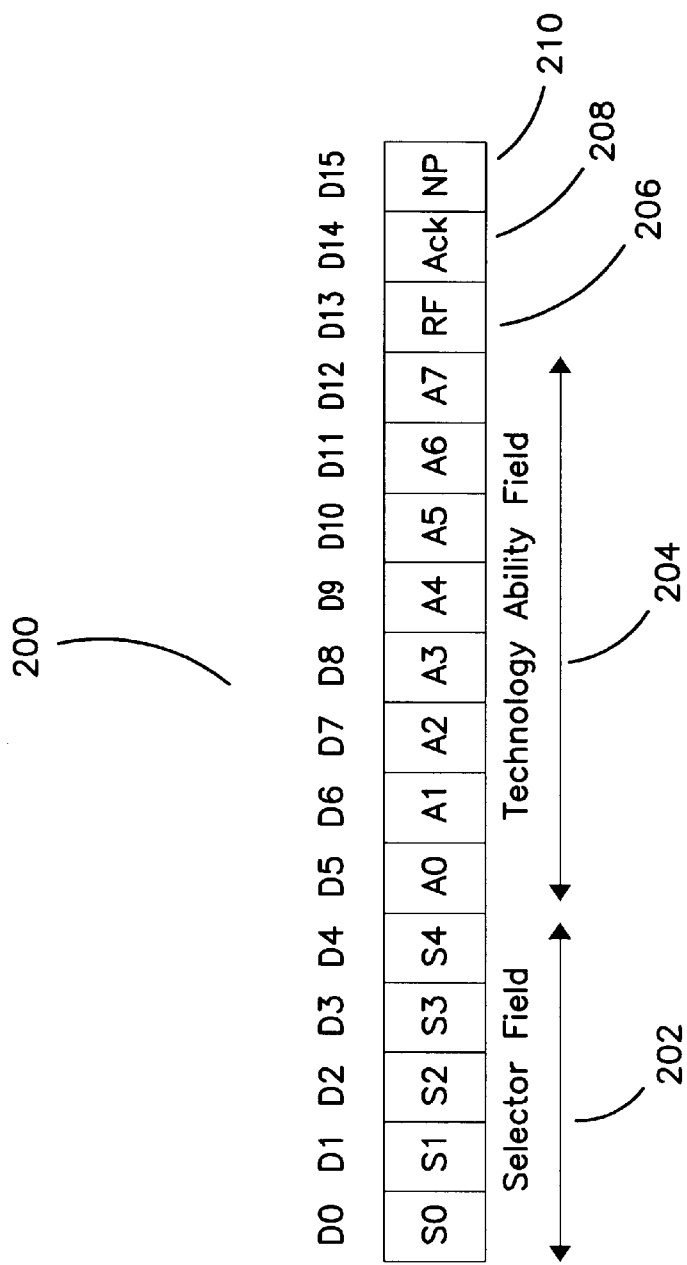
FIG. 2 illustrates the fields of the Link Code Words.

Auto-negotiation 126 communicates with the physical medium attachment sublayer 122 through the physical medium attachment service interface 130. Auto-negotiation's 126 flexibility and expandability is provided through the encoding of a 16 bit word. The 16 bit word is referred to as the Link Code Word (LCW). The LCW 200 is encoded as shown in FIG. 2.

The selector field 202 allows 32 different definitions of the technology ability field 204 to coexist. The intention is to allow standard technologies to leverage the basic auto-negotiation mechanism. Currently, selector field 202 with a value of 00001 is assigned to IEEE 802.3 and selector field 202 with a value of 00010 is assigned to IEEE 802.9. Two more selector field 202 codes are reserved for expansion of auto-negotiation. The remaining selector field 202 codes are reserved to be assigned to standard technologies that wish to leverage this mechanism, yet fall outside the scope of the currently defined value of the selector field 202.

The technology ability field 204 is defined relative to the value of selector field 202 of the Link Code Word 200. Priority resolution works such that when the remaining bits in the technology ability field 204 are eventually defined, the new technology can be inserted anywhere in the list without disturbing the existing hierarchy. This means that the reserved bits can be assigned without causing inter-operability problems with any auto-negotiation device produced before these bits were defined.

The Remote Fault bit 206, RF, allows transmission of simple fault information to the Link Partner. The Acknowledge bit 208, Ack, is used by the synchronization mechanism to ensure robust data transfer. The Next Page bit 210, NP, advertises to the Link Partner whether the Next Page function is supported. The Next Page function is used to send additional information beyond the basic configuration information. Both ends must have Next Page ability in order to exchange this type of information.

Figure 3:
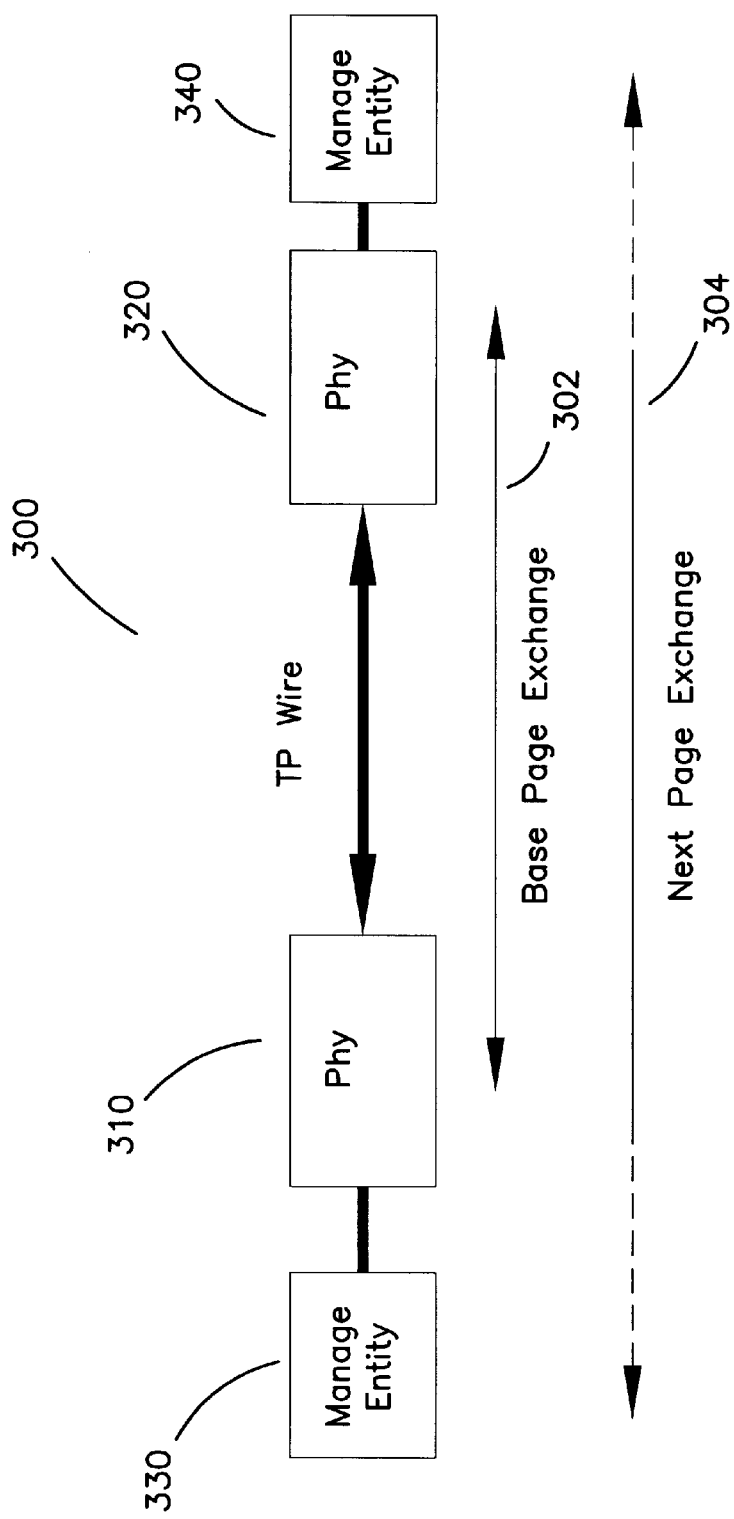
FIG. 3 is a block diagram illustrating Base Page and Next Page auto-negotiation between a local Physical Layer Device and a remote Physical Layer Device as required by T2.

FIG. 3 is a block diagram 300 illustrating Base Page 302 and Next Page 304 auto-negotiation between a local Physical Layer Device 310 and a remote Physical Layer Device 320 as required by T2. The Next Page function 304 uses the standard auto-negotiation mechanisms to exchange data. This data is carried by the optional Next Pages of information, which follow the transmission and acknowledgment procedures used for the Base Link Code Word 200 as illustrated with reference to FIG. 2.

In FIG. 3, both Physical Layer Devices 310, 320 exchange Base Pages 302. A management entity 330 then writes a Next Page 304 to a Next Page register (not shown). The Next Page 304 then may be transmitted to the remote Physical Layer Device 320. The remote Physical Layer Device 320 then puts the received Next Page 304 into a register (not shown) which is then read by a management entity 340 of the remote Physical Layer Device 320. This occurs both ways until all Next Pages are sent. Each Physical Layer Device 310, 320 must be implemented with management capability in order to provide Next Page capability.

As discussed with reference to FIG. 3, Next Page 304 exchange occurs after the Base Link Code Words 302 have been exchanged. Next Page 304 exchange includes the normal auto-negotiation arbitration process to send Next Page messages 304. Two message encodings are defined to control the Next Page functionality. These are Message Pages and Unformatted Pages.

FIG. 4 is a table 400 illustrating the technology bit filed for identifying the technical capabilities by the Link Code Word for the IEEE 802.3 selector Base Page. The technology bit field includes bits D5 through D12, i.e., A0–A7 402 respectively. Bit A0 404 indicates that 10Base-Tx is supported 406. Bit A1 408 indicates whether a device supports 10Base-Tx full duplex mode 410. Bit A2 412 indicates whether a device supports 100Base-Tx 414. Bit A3 416 indicates whether a device supports 100Base-Tx full duplex 418. Bit A4 420 indicates whether a device supports 100BASE-T4 422. Bits A5–A7 424 are reserved for future technologies 426.

FIG. 5 is a table 500 illustrating the technology bit field for identifying the technical capabilities of a device by the Link Code Word for the Next Page number 1. According to FIG. 5, bit A0 502 indicates a device supports 100BASE-T2 504 and bit A1 506 indicates whether the device supports 100BASE-T2 in a full duplex or half duplex mode 508. Bit A2 510 indicates the type of 1-0BASE-T2 device 512, i.e., a logic 1 indicates a repeater and a logic 0 indicates a data terminal equipment. Bit A3 514 indicates whether one of the devices will be forced to a particular master slave mode 516. A logic 1 indicates that override is enabled, wherein logic 0 indicates that there is no override. Bit A3 514 is used in conjunction with bit A4 514. Bit A4 518 indicates whether the device will be a master or slave 520, wherein a logic 1 identifies the device as a master and a logic 0 indicates the device as a slave. Bits A5–A7 522, 524, 526 are the 100BASE-T2 master/slave seed bits 528, 530, 532.

FIG. 6 is a table 600 representing the priority schedule for the technologies identified through the Link Code Word auto-negotiation process. 100Base-T2 full duplex 602 is ranked number 1 604 and has priority over 100Base-T2 half duplex 606 which is ranked number 2 608. 100Base-T2 half duplex 606 is ranked over 100Base-Tx full duplex 610 which is ranked number 3 612. 100Base-Tx full duplex 610 is ranked over 100Base-T4 614 which is ranked number 4 616. 100Base-T4 614 is ranked over 100Base-Tx half duplex 618 which is ranked number 5 620. 100Base-Tx half duplex 618 is ranked over 10Base-T full duplex 622 which is ranked number 6 624. Finally, 10Base-T full duplex 622 is ranked over 10Base-Tx half duplex 626 which is ranked number 7 628. The rationale for this hierarchy is straight forward. 10Base-T types 622, 626 are the lowest common denominator and therefore has the lowest priority. Full duplex solutions 602, 610, 622 are always higher in priority than their half duplex counterparts 606, 618, 626 respectively. 100Base-T2 602, 606 has priority over 100Base-Tx 610, 618 and 100Base-T4 614 because 100Base-T2 runs across a broader spectrum of copper cabling and can support wider base of configurations. 100Base-T4 614 is ahead of 100Base-Tx half duplex 618 because 100Base-T4 614 runs across a broader spectrum of copper cabling.

Figure 7:
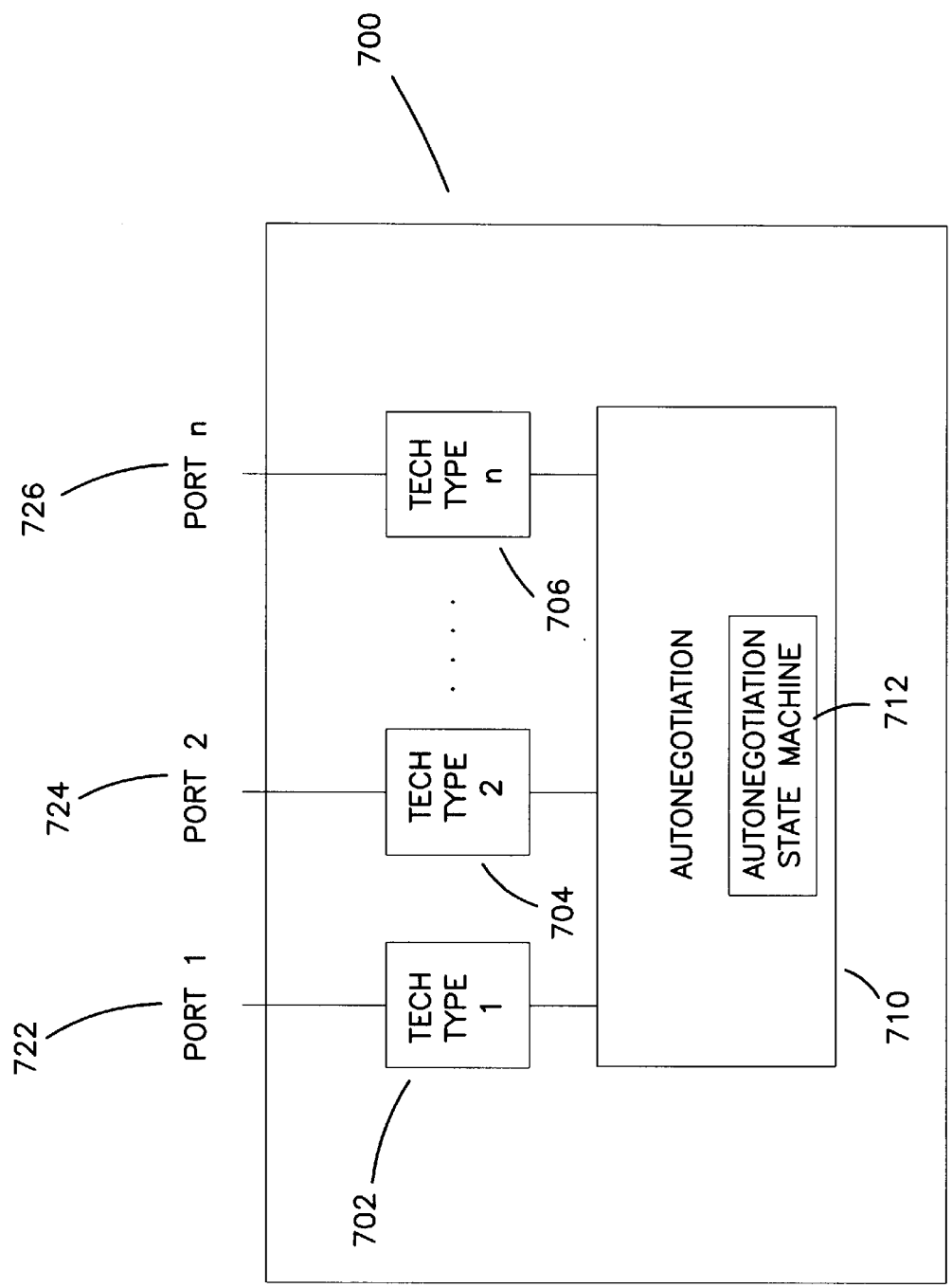
FIG. 7 illustrates a block diagram of a Physical Layer Device according to the present invention.

FIG. 7 illustrates a block diagram of a Physical Layer Device 700 according to the present invention. The Physical Layer Device 700 may include multiple technology transceivers 702, 704, 706 such as 10 Base T, 100 Base X, 100 Base T4, or 1 G at each port. Furthermore, the Physical Layer Device 700 provides auto-negotiation functions 710 to control the auto-negotiation process described in Clause 28 of the IEEE 802.3u specification.

After reset, an auto-negotiation state machine 712 first checks to see if auto-negotiation functions 710 are enabled. If the auto-negotiation functions 710 are not enabled, the auto-negotiation state machine 712 remains in this state. If the auto-negotiation functions 710 are enabled, the auto-negotiation state machine 712 disables transmission, waits for a period of time guaranteed to break the link with the connected partner, and then begins the auto-negotiation process. Once the link is broken, the local device transmits Fast Link Pulses which announce its available technologies to the connected device. It also waits for either fast link pulses or signals characteristic of a specific technology to be transmitted by the connected device.

This second method is known as parallel detection. However, as mentioned earlier, parallel detection causes a problem in a Physical Layer Device 700 implementing multiple technologies 702, 704, 706 and/or multiple ports 722, 724, 726. Receivers 702, 704, 706 for each technology are enabled on each port 722, 724, 726 causing power consumption that requires more expensive integrated circuit packages and heat dissipation techniques. Therefore, a Physical Layer Device 700 according to the present invention decreases power consumption by enabling the receivers 702, 704, 706 required for parallel detection only for a brief period of time to check for the presence of the required signals. The receivers 702, 704, 706 are then disabled for a much greater period of time before being enabled again.

For Physical Layer Devices 700 containing multiple ports 722, 724, 726, the enabling of the receivers 702, 704, 706 are staggered so that only one port's receiver is active at any given time. This reduces the maximum current draw of the device.

While the Physical Layer Device 700 of FIG. 7 illustrates a multiple port device 722, 724, 726 capable of multiple technologies 702, 704, 706 wherein each port is capable of only one type of technology, those skilled in the art will recognize that the invention is applicable to Physical Layer Devices wherein either one or multiple ports are provided, but with each port capable of more than one technology. For example, the Physical Layer Device 700 of FIG. 7 may include only a single port 722 having a parallel detection receiver for technology types 702 and 704. Thus, during auto-negotiation, the parallel detection receiver for each technology may be cycled on and off thereby reducing total power consumption. In addition, if more than one technology requires parallel detection, the enablement of each technology may be staggered to guarantee that only one receiver is enabled at a time to further reduce power consumption.

Figure 8:
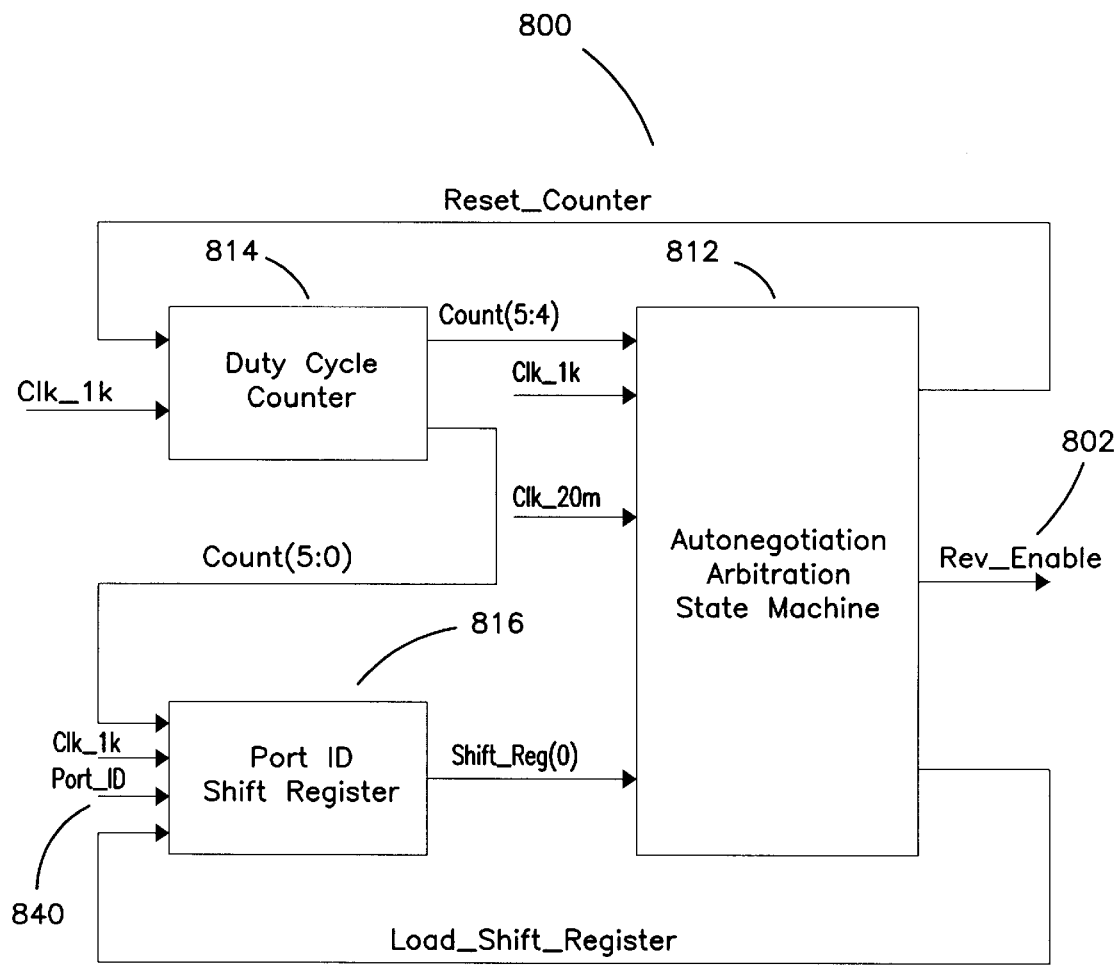
FIG. 8 above shows one embodiment of the present invention for enabling a parallel detection receiver in one of the ports of a multi-port device.

FIG. 8 shows one embodiment 800 of the present invention for generating a signal 802 to enable a parallel detection receiver in one of the ports of a multi-port device. The major blocks include the Autonegotiation Arbitration State Machine 812 which is described in Clause 28 of 802.3u, a Duty Cycle Counter 814 which is a 6 bit counter that increments every 1 ms and times how long the receiver is enabled, and a Port ID Shift Register 816 which is loaded with a unique Port ID 840 for each port to make sure that the enabling of the receivers is staggered to reduce maximum current draw. The shift register 816 is designed such that bit 0 is shifted into bit 1, bit 1 is shifted into bit 2, etc., and the most significant bit is shifted into bit 0.

Parallel detection occurs in the state ABILITY_DETECT, defined in the Arbitration State Diagram in Clause 28 of 802.3u as incorporated by reference herein. During the ABILITY_DETECT state, the receivers that require parallel detection are cycled. If one of the receivers recognizes the characteristic signals of its technology it will remain enabled and the receivers for other technologies in that port will be disabled. If FLPs are received that satisfy the auto-negotiation requirements, then all parallel detection receivers can be disabled until the auto-negotiation process is finished at which point only the highest common technology is enabled. Using this procedure, only the receiver required for FLP reception and one of the specific technology receivers will be enabled at the same time. Only the FLP receiver will enabled the majority of the time.

When the Autonegotiation State Machine 812 is in any state other than the ABILITY_DETECT state, the Duty Cycle Counter 814 is reset and the Port ID Shift Register 816 is loaded with only a single bit set to a logic 1. When in the ABILITY_DETECT state, the counter 814 increments every 1 ms and the shift register 816 shifts to the next stage on the 1 Khz clock edge that the counter 814 is at its terminal count of "111111". The Rcv_Enable signal 802 enables the parallel detection receiver. The Rcv_Enable signal 802 will be active when the most significant two bits of the counter 814 are "00" and when the least significant bit of the shift register 816 is a logic 1. This enables the parallel detection receiver for ¼ of the time that shift register for that port is active. The receiver for that port will be disabled the entire time that its shift register 816 is inactive.

As an example, assume this is a four port device. The shift register 816 in port 0 will be loaded with the value "0001" where the "1" is loaded into bit 0. Likewise, the shift register in ports 1, 2, and 3 will be loaded with the values "0010", "0100", and "1000" respectively (not shown). When the Autonegotiation State Machine 812 in Port 0 reaches the state ABILITY_DETECT, the counter 814 will be at "000000" and bit 0 of the shift register 816 will be "1". This means that Port 0's parallel detection receiver will be turned on initially and all other receivers will be off. After 16 ms, the counter 814 will reach the value "1010000" at which time port 0's receiver will be turned off. For the next 48 ms, all parallel detection receivers will be off at which time the shift register 816 in Port 0 will shift to the value "0010". This keeps the parallel detection receiver enable signal 802 off until the shift register 816 returns to the value "0001" which will happen 192 ms later, i.e., three times the 64 ms period of the counter. The parallel detection receiver will be on for 16 ms in a period of 256 ms, i.e., 16+48+192=256 ms or 6.25% of the time. Once the Autonegotiation Arbitration State Machine 812 has determined the technology of its connected partner, it leaves the ABILITY_DETECT state and controls the receiver enable signals depending on the technology without regard to the counter 814 or the shift register 816.

Figure 9:
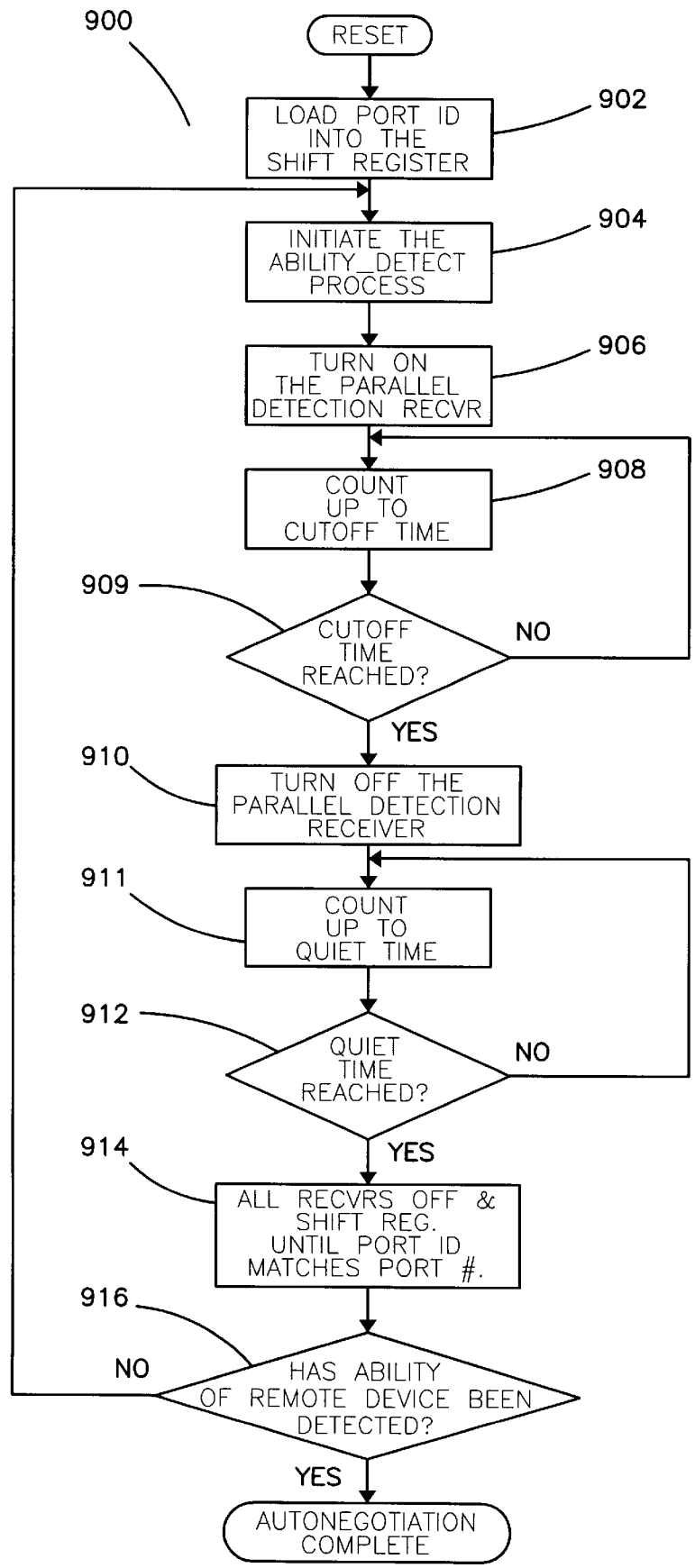
FIG. 9 illustrates a flow chart of the method for conserving power by staggering the enabling of parallel detection receivers in a Physical Layer Devices.

FIG. 9 illustrates a flow chart 900 of the method for conserving power by staggering the enabling of parallel detection receivers in Physical Layer Devices. First a shift register is loaded with a port identification value 902. Then an ability detection process is initiated 904 to determine a technology capability of a remote device when a port number matches the port identification value. This turns on a parallel detection receiver and all parallel detection receivers not corresponding to the port identification number are turned off 906. In the meantime, a counter is counting up to a predetermined cutoff time for the parallel detection receiver 908. When the predetermined cutoff time is reached 909, the parallel detection receiver is turned off 910. The counter counts up to a predetermined quiet time 911. When the predetermined cutoff time is reached 912, all receivers are off and the register is shifted until the port number matches the port identification value 914. Then, the process is cycled until the ability of the remote device is determined 916.

In summary, a Physical Layer Device according to the present invention has power savings features operable during auto-negotiation for multiple technologies. A Physical Layer Device according to the present invention allows the power required by the receivers during parallel detection to be decreased. The receivers are enabled for a brief period of time to check for the presence of the required signals, and then disabled for a much greater period of time before being enabled again. For Physical Layer Devices containing multiple ports, the enabling of the receivers is staggered so that only one port's receiver is active at any given time.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A Physical Layer Device comprising:

a plurality of ports, each port comprising:

a parallel detection receiver for receiving data and messages from a connected device, the data and messages including auto-negotiation fast link pulses indicating a technology capability of the connected device;

a cycler, coupled to the parallel detection receiver, for turning the parallel detection receiver on for a fraction of an auto-negotiation period; and a controller, operatively coupled to the cycler, for controlling the cycler;

wherein the controller controls the cycler to stagger the powering on of the receiver for each port to prevent more than one receiver from being powered at one time.

2. The Physical Layer Device of claim 1 wherein the fraction comprises 1/nth of the auto-negotiation period, where n is the number of ports.

3. A Physical Layer Device, comprising:

a plurality of transceivers for supporting transfer of data and messages with a connected device, the data and messages including autonegotiation fast link pulses indicating technology capability of the plurality of transceivers and the connected device;

a cycler, coupled to the plurality of transceivers, for turning the plurality of transceivers on, the turning on of the plurality of transceivers being staggered to power on only one of the plurality of transceivers at once; and a controller, operatively coupled to the cycler, for controlling the cycler to stagger the powering on of the receiver for each port to prevent more than one receiver from being powered on at one time.

4. The Physical Layer Device of claim 3 wherein the cycler comprises:

a shift register for receiving a port identification code, the shifting of the identification code allowing an indication of port enablement; and an auto-negotiation arbitration state machine, coupled to the shift register, for receiving the indication of port enablement from the shift register, the arbitration state machine enabling the parallel detection receiver upon receiving the port enablement indication.

5. The Physical Layer Device of claim 4 wherein the controller comprises a duty cycle counter for controlling the shifting of the port identification codes in the shift register and for providing a disable signal for disabling the parallel detection receiver.

6. A Physical Layer Device, comprising:

a parallel detection receiver for detecting a technology ability of a connected device;

a shift register for receiving a port identification code, the shifting of the identification code allowing an indication of port enablement;

a duty cycle counter, coupled to the shift register, for controlling the shifting of the port identification codes in the shift register and for providing a disable signal for disabling the parallel detection receiver; and an auto-negotiation arbitration state machine, coupled to the shift register and the duty cycle counter, for receiving the indication of port enablement from the shift register and for receiving the disable signal from the duty cycle counter, the arbitration state machine enabling the parallel detection receiver upon receiving the port enablement indication and disabling the parallel detection receiver upon receipt of the disable signal from the duty cycle counter.

7. A method of conserving power by staggering the enabling of parallel detection receivers in a Physical Layer Devices, comprising the steps of:

(a) loading a shift register with a port identification value;

(b) beginning an ability detection process to determine a technology capability of a remote device when a port number matches the port identification value;

(c) turning on a parallel detection receiver;

(d) counting up to a predetermined cutoff time;

(e) turning the parallel detection receiver off when the predetermined cutoff time is reached;

(f) waiting for a predetermined quiet time wherein all receivers are off;

(g) shifting the shift register until the port number matches the port identification value; and (f) repeating steps (b)–(g) until the ability of the remote device is determined.

8. The method of claim 7 further comprising the step of controlling the receiver according to the ability determined without regard to the counter or the shift register.

9. The method of claim 8 further comprising the step of turning off parallel detection receivers not corresponding to the port identification number.

10. A Physical Layer Device comprising:

a port comprising a first parallel detection receiver for receiving data and messages from a connected device, the data and messages including auto-negotiation fast link pulses indicating a technology capability of the connected device;

a cycler, coupled to the first parallel detection receiver, for turning on power to the first parallel detection receiver for a fraction of an auto-negotiation period; and a controller, operatively coupled to the cycler, for controlling the cycler;

wherein the the power to the first parallel detection receiver is cycled to reduce power consumption by the Physical Layer Device.

11. The Physical Layer Device of claim 10 wherein the port further comprises a second parallel detection receiver, the second parallel detection receiver capable of a second type of technology.

12. The Physical Layer Device of claim 11 wherein enablement of the second parallel detection receiver is cycled to reduce power consumption.

13. The Physical Layer Device of claim 11 wherein the cycling of the first and second parallel detection receivers is staggered to prevent simultaneous enablement to reduce the maximum current draw for the Physical Layer Device.

* * * * *